United States Patent
Iimori et al.

(10) Patent No.: US 9,481,101 B2
(45) Date of Patent: Nov. 1, 2016

(54) SHEET GROOVE CUTTER CAPABLE OF OPERATION WITHOUT USE OF RULER

(76) Inventors: Ikumi Iimori, Saitama (JP); Yoshiharu Azuma, Tokyo (JP)

( * ) Notice: Subject to any disclaimer, the term of this patent is extended or adjusted under 35 U.S.C. 154(b) by 0 days.

(21) Appl. No.: 14/354,140

(22) PCT Filed: Jun. 26, 2012

(86) PCT No.: PCT/JP2012/004132
§ 371 (c)(1),
(2), (4) Date: Apr. 25, 2014

(87) PCT Pub. No.: WO2013/061491
PCT Pub. Date: May 2, 2013

(65) Prior Publication Data
US 2014/0260886 A1    Sep. 18, 2014

(30) Foreign Application Priority Data
Oct. 27, 2011   (JP) .................................. 2011-249103

(51) Int. Cl.
*B26B 29/06* (2006.01)
*B27B 27/00* (2006.01)
(Continued)

(52) U.S. Cl.
CPC ............. *B26D 3/065* (2013.01); *E04F 21/165* (2013.01); *E04F 21/1652* (2013.01); *B29C 65/42* (2013.01);
(Continued)

(58) Field of Classification Search
CPC . B26D 3/065; E04F 21/165; Y10T 83/0304; B29C 65/42; B29C 66/43; B29L 2031/3017
USPC ............................... 30/286, 289, 290; 83/875
See application file for complete search history.

(56) References Cited

U.S. PATENT DOCUMENTS 2,882,594 A * 4/1959 Long ...................... B44D 3/162
30/170
4,501,069 A * 2/1985 Kohno ............................ 30/293
(Continued)

FOREIGN PATENT DOCUMENTS

DE     196930704 U    11/1969
DE       3318914 A1   11/1984
(Continued)

OTHER PUBLICATIONS

International Search Report from PCT/JP2012/004132 dated Jul. 24, 2012.
(Continued)

*Primary Examiner* — Omar Flores Sanchez
(74) *Attorney, Agent, or Firm* — Millen White Zelano & Branigan, P.C.

(57) ABSTRACT

A groove cutter for floor sheets capable of being operated without using a ruler and can cut a seam, which is created when sheets are laid sequentially on the surface of floor base with an adhesive agent, so that a groove formed along the seam can bridge over both adjacent sheets, comprising a front part, a middle part, a rear part, wherein the front part has a thin guide plate, which is to be inserted into the seam and guides the tool along the seam when pushing the tool forward, at the front end, and at least one blade to cut a concave groove at the seam part of the sheet, which is provided behind the guide plate so as to be detachable, and a stabilizing member provided at the rear part, which is to be inserted into the concave groove, to stabilize a direction of movement along the seam.

11 Claims, 7 Drawing Sheets

(51) Int. Cl.
*B26D 3/06* (2006.01)
*E04F 21/165* (2006.01)
*B29L 31/30* (2006.01)
*B29C 65/42* (2006.01)
*B29C 65/00* (2006.01)

(52) U.S. Cl.
CPC ...... *B29C 66/02241* (2013.01); *B29C 66/1142* (2013.01); *B29C 66/43* (2013.01); *B29L 2031/3017* (2013.01); *Y10T 83/0304* (2015.04)

(56) References Cited

U.S. PATENT DOCUMENTS

| | | | |
|---|---|---|---|
| 6,112,417 A * | 9/2000 | Hyer et al. | 30/290 |
| 6,640,446 B2 | 11/2003 | Martinez | |
| 6,748,659 B1 * | 6/2004 | Street | 30/2 |
| 2003/0115760 A1 | 6/2003 | Martinez | |
| 2013/0160303 A1 * | 6/2013 | Everett | 30/287 |

FOREIGN PATENT DOCUMENTS

| | | |
|---|---|---|
| DE | 198805314 U1 | 7/1988 |
| DE | 4408396 A1 | 9/1995 |
| EP | 0297684 A1 | 1/1989 |
| JP | 60-097841 U | 7/1985 |
| JP | 60097841 U | 7/1985 |
| JP | 4625541 B1 | 2/2011 |

OTHER PUBLICATIONS

English language Bibliography of corresponding German Patent Application No. DE198805314; published Jul. 14, 1988.
English language Abstract of corresponding German Patent Application No. DE3318914; published Nov. 29, 1984.
English language Bibliography of corresponding German Patent Application No. DE196930704; published Nov. 27, 1969.
English language Abstract of corresponding German Patent Application No. DE4408396; published Sep. 21, 1995.
English language Bibliography of corresponding Japanese Application No. JP60097841; published Jul. 3, 1985.
Supplemental European Search Report dated Nov. 12, 2015 for corresponding European Application No. 12844301.

* cited by examiner

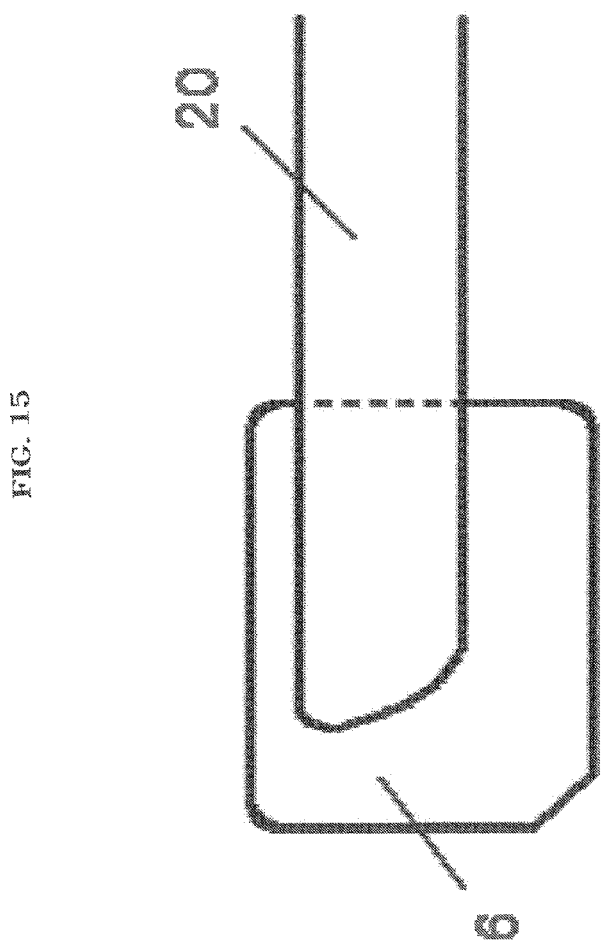

SHEET GROOVE CUTTER CAPABLE OF OPERATION WITHOUT USE OF RULER

TECHNICAL FIELD

The present invention relates to a groove cutter for floor sheets which can form a concave groove, necessary for bonding tightly the adjacent floor sheets by use of a welding rod, on the seam formed by the adjacent floor sheets, and in particular relates to a groove cutter for floor sheets wherein a concave groove at a seam, which is formed bridging over the floor sheets, can be formed rapidly and accurately without using a ruler.

BACKGROUND OF THE INVENTION

Generally, when floor sheets are bonded to a base sheet of floor, in order to bind a seam of individual floor sheets tightly, a method of pouring a heat melted welding rod into the said seam is used. In this case, since the floor sheets are laid so closely each other from the beginning, it is difficult to press directly the heat melted welding rod into the narrow gap, which exists at the seam, from the top of the seam. Therefore, even if the welding rod had been pressed into the gap, the heat melted welding rod merely becomes firm on the surface of the seam in a state of being raised (See, FIG. 1). If this raised area is simply whittled away to flat the floor surface, the original seam appears again and the floor surface just returns to the original state. Therefore, it is practically impossible to bind each floor sheet tightly by using such method.

Generally, a U-shaped or V-shaped groove is cut at the seam part by using a hand cutter or the like (See, FIGS. 2 and 3), then the heat melted welding rod is poured into the groove (See, FIG. 4), and the raised area on the surface is whittled away to finish the surface flatly (See, FIG. 5). According to this method, except when it is difficult to cut a groove having desired depth since sheets are thin or hard, it is possible to bind sheets tightly to some extent.

In either case, it is required that the concave groove is formed uniformly along a seam without being displaced to right or left from a center of the seam by means of the above groove-cutting work. Therefore, in order for the seam to be placed at the center of a U-shaped or V-shaped blade of cutter, a ruler is usually set parallel to the seam, and the groove is cut contacting the blade of cutter with the ruler. With regard to this method, if the seam is short in length, it does not take time or care to work so much. However, when a floor space is larger and a seam is longer in length, there is a disadvantage that it takes an immense amount of time and effort and also an operating cost becomes huge.

In order that the groove can be cut easily on the seam of sheets, a grooving tool having a guiding function is proposed (for instance, Patent document 1). By using this tool, a relatively stable operation can be performed due to a support structure having a two contact points consisting of a blade edge and a guiding roller against sheet surfaces. However, since the distance between the support points and a grip is long, there are disadvantages that not only the stability is limited but also a tool itself is easy to break.

In addition, a floor grooving device equipped with rollers having a function for a guiding seam, at the front end portion and the rear end portion of the device itself is proposed (Patent document 2). With regard to this device, there was a disadvantage that this device causes a risk to cut off the part other than the seam of the floor in the process of operation, since the front roller, which is the seam guide, is apt to run off from the seam. Furthermore, there were other disadvantages that the device cannot follow the seam sufficiently, since the rear roller, even though a width of it is wider than that of the above front roller, is not always stable in the wide cut groove which is formed by a blade equipped just behind the roller provided at front of the device, and also the device cannot sufficiently correspond to surface irregularities of floor. And also, there was one more disadvantage that, the rear roller, and if the second blade is provided at the rear, the second blade should also be detached when a curved groove is formed, which is a troublesome operation.

PRIOR ART DOCUMENTS

Patent Documents

Patent document 1: Japanese Unexamined Utility Model Publication Jitsu kai hei 6-57606
Patent document 2: U.S. Pat. No. 6,640,446
As a result of extensive studies for improving the above conventional disadvantages, the inventors of the present invention found that, when a nonrotating thin fixed plate which is inserted into the seam formed between sheets to guide the tool along the seam is provided, and also a blade is provided behind that plate in order to cut the seam part so as to have a concave-shaped groove, and further a wheel having a width matched to a groove formed by the above blade, or a fixed member of which cross-sectional shape at the end fits into the above groove is provided near the rear end of tool, not only this tool can follow the seam very well, but also it can be improved in following the surface irregularities of the floor, maintaining a light operability and the depth of groove formed at the seam can be uniformed better than ever. The inventors also found that it becomes difficult for a welding rod pressed into the seam for filling up to detach by forming the second groove inside the above first groove, and that the bond between sheets can be tightened much better than ever by the second groove, and further found that, by making the tool bottom near the front end having the thin plate incline at a suitable angle moderately toward the end upward and making the thin plate nonangular-shaped so as to incline the tool forward easily, it becomes possible to operate the tool easily along the seam by inclining the tool forward even when the seam is curved, thereby achieving the present invention.

SUMMARY OF THE INVENTION

Problems to be Solved by the Invention

Therefore, the first object of the present invention is to provide a groove cutter for floor sheets wherein it is possible to be operated easily corresponding with the surface irregularities of floor without using a ruler or the like and a groove having excellent uniformity of depth can be cut rapidly and accurately at the seam of floor sheets.

The second object of the present invention is to provide a groove cutter for floor sheets, which can be operated along the curved seam easily.

The third object of the present invention is to provide a groove cutter for floor sheets wherein the second groove can be cut continuously inside the first groove by one time operation.

Means to Solve the Problems

The above objects of the present invention were attained by a groove cutter for floor sheets which is a tool capable of being operated without using a ruler and can cut a seam, which is created when sheets are laid sequentially on the surface of floor base with an adhesive agent, so that a groove formed along the seam can bridge over both adjacent sheets, comprising a front part, a middle part, a rear part, wherein the front part has a thin guide plate, which is to be inserted into the seam and guides the said tool along the seam when pushing the tool forward, at the front end, and at least one blade to cut a concave groove at the seam part of the above sheet, which is provided behind the guide plate so as to be detachable, and also a stabilizing member provided at the rear part, which is to be inserted into the concave groove, to stabilize a direction of movement of the tool along the seam; and the method for cutting groove at the seam of sheets, wherein by means of one time operation, shallower groove than the thickness of the sheet is formed by the first blade, then a deeper groove is formed by the second blade inside the groove formed by the above first blade.

The groove cutter for floor sheets of the present invention may provide a blade, which may be detachable or slidable in and out, at the rear part so that when the tool is turned 180 degrees, that is, it is the opposite direction, the said blade is able to act as the blade for cutting a concave groove at the seam part, and a bottom part of the front part having the thin guide plate may also be provided so as to be able to slide back and forth.

In addition, a pair of rollers and/or wheels running on the surface of the sheet may be provided on the right and left side, near the stabilizing member of the rear part of the tool, and an independent grip may be provided mainly over the middle part. Furthermore, it is preferable to provide the first blade just behind the guide plate, and to provide the second blade having a narrower width than the first blade behind the first blade so as to be free to detach and so as to be able to cut much deeper groove inside the groove formed by the first blade.

Furthermore, it is preferable that the stabilizing member set at the rear part is a wheel having a width almost corresponding to the groove formed by the blade(s), or the fixed member having a cross-sectional shape almost corresponding to a cross-sectional shape of the groove. Also, it is preferable that the bottom surface of the front end part having the guide plate inclines upward, and the above guide plate, without having angles, is designed to have a smooth shape in order to be able to incline the tool forward easily along the inclined surface.

Moreover, the groove cutter for floor sheets of the present invention may have the constitution of the invention, wherein the front end portion which is set before the first blade provided at the front part and has the guide plate, is detachable from the tool or 90 degrees or more turnable upward, and when the said front end portion is detached or is turned 90 degrees or more upward, the first blade at the front part sticks out from the tool.

Effect of the Invention

By using the groove cutter of the present invention, a concave groove can be easily and accurately obtained at the seam existing between the sheets without using a ruler or the like, and the concave groove also can be easily and accurately obtained along the seam and at the seam, which is created between the sheets attached to base sheets having small surface irregularities or formed as curved seam from a design-centric viewpoint, although it was difficult in these cases to obtain the concave groove beautifully even though the ruler or the like was used. In addition, in cases of cutting further groove inside the groove cut first, by means of the present invention, the working efficiency of grooving welding operation can be remarkably improved and adjacent sheets are bound much stronger each other than ever, since the melted welding rod pressed into the groove can hardly be detached from the groove formed at the seam of the floor sheets.

BRIEF DESCRIPTION OF THE DRAWINGS

FIG. 15 is a close up view of the guide plate of FIG. 8 with a smooth shape, having no corners, and inclined upward.

MODE FOR CARRYING OUT THE INVENTION

Hereafter, the present invention is explained according to Examples, however, the present invention is not limited by these Examples. In this regard, the groove cutter for floor sheets of the present invention will be described and explained simply as "a tool" in the present specification.

Figure 1:
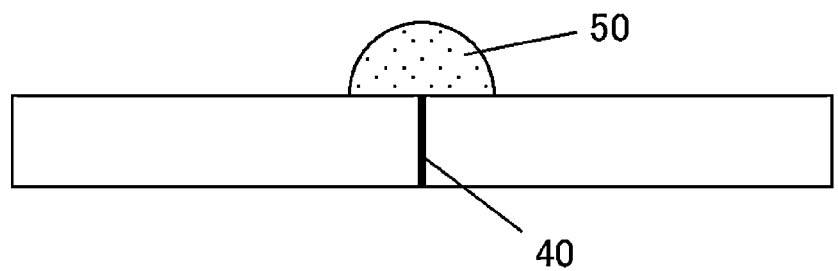
FIG. 1 is a cross-sectional view indicating the state wherein the seam part having no cutting groove is only covered by a melted welding rod.
Figure 2:
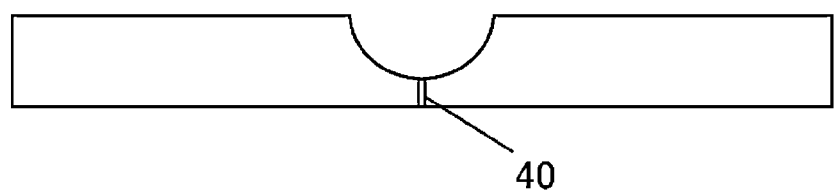
FIG. 2 is a cross-sectional view indicating the state wherein a U-shaped groove is cut at a seam of floor sheets.
Figure 3:
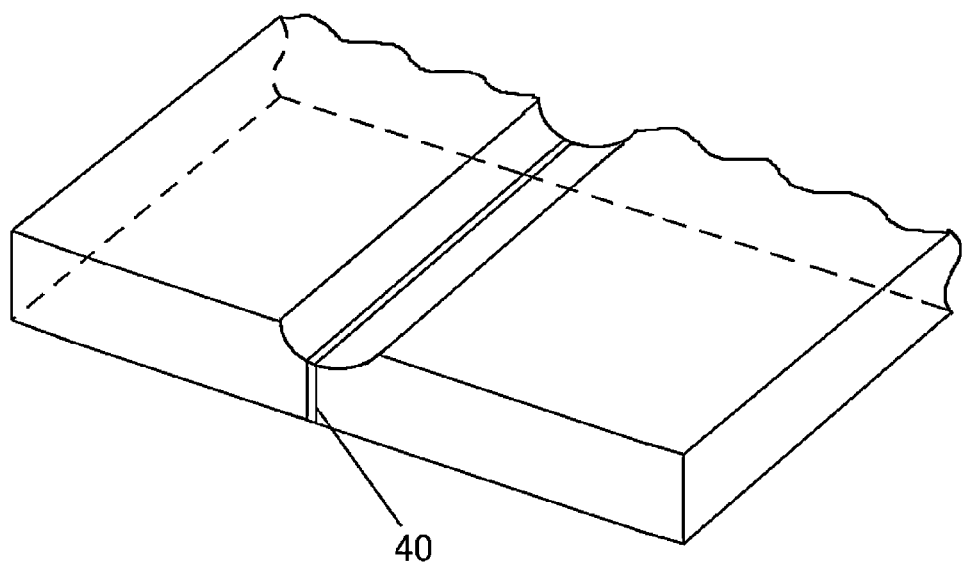
FIG. 3 is a perspective view looking from the upper side, indicating the state wherein a U-shaped groove is formed at the seam of the floor sheets.
Figure 4:
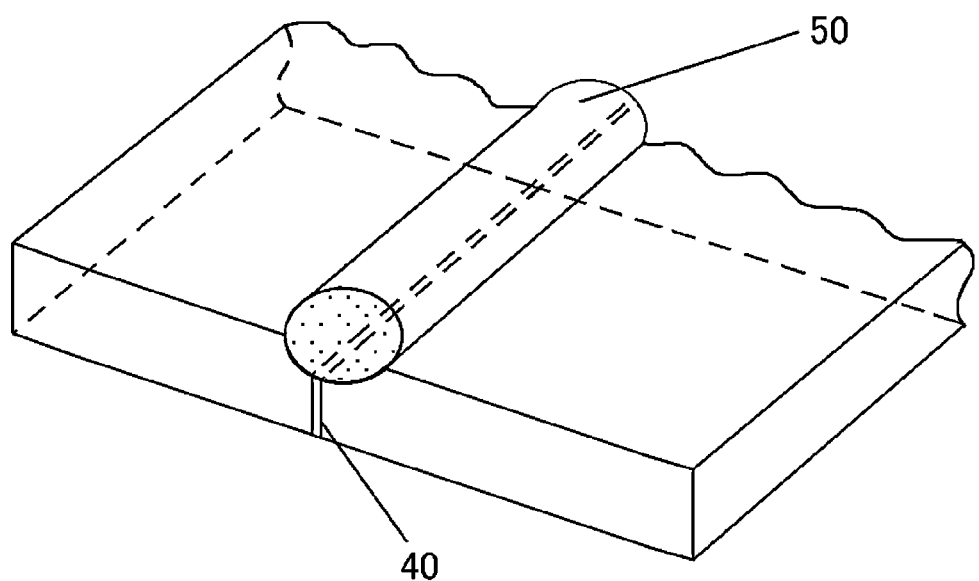
FIG. 4 is a perspective view looking from the upper side, indicating the state wherein a heat melted welding rod is poured into a U-shaped groove formed at the seam of floor sheets.
Figure 5:
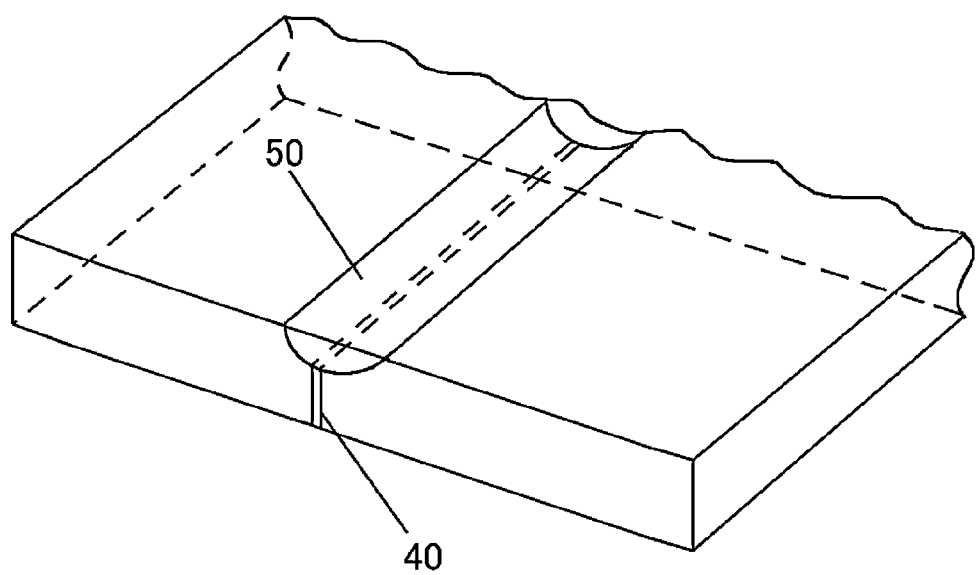
FIG. 5 is a perspective view looking from the upper side, indicating the state wherein the heat melted welding rod is poured into the U-shaped groove formed at the seam of floor sheets to solidify and then the welding rod area raised from the surface is whittled away to flat the surface.
Figure 6:
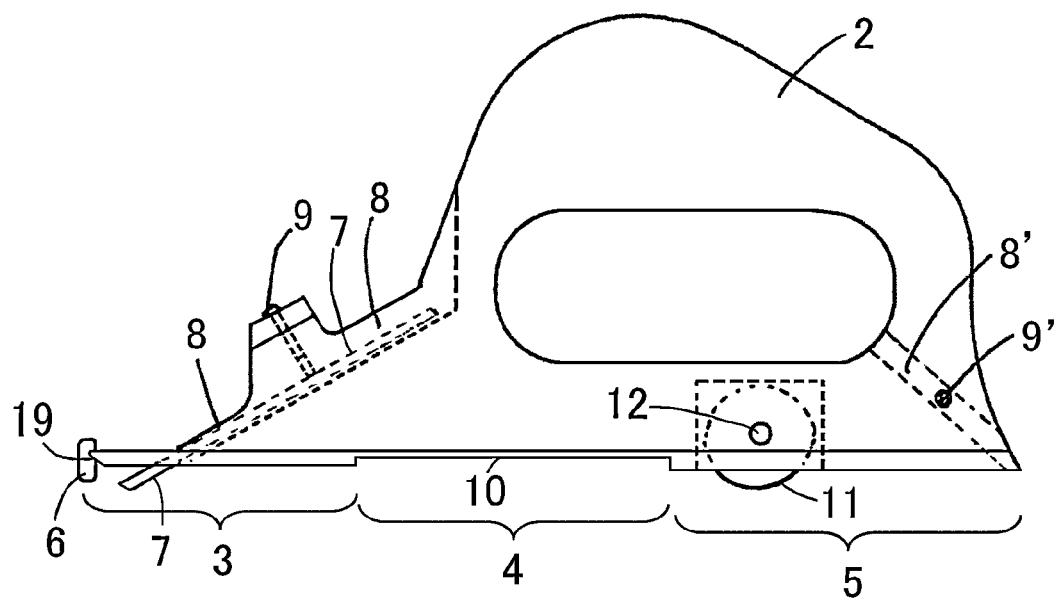
FIG. 6 is a left side view indicating an example of the groove cutter of the present invention.

FIG. 6 is an example of side view of the groove cutters of the present invention for the case of manufacturing the body integrally except the bottom and the movable portions. In the views, numeral 1 is the tool body of the present invention, 2 is the grip, 3 is the front part, 4 is the middle part, 5 is the rear part, 6 is the thin guide plate guiding the seam of floor sheets, 7 is the cutting blade for the U-shaped or V-shaped concave groove, 8 and 8' are groove-like or tube-like spaces set for equipping the groove-cutting blade, 9 and 9' are screw bolts for detaching the groove-cutting blade or adjusting a position of the groove-cutting blade, 10 is the bottom part covering the whole area of the above front, middle and rear parts. It is preferable that the middle part is designed so as not to contact with the floor sheets, in order to move the tool lightly when used and in order to follow well the surface irregularities of floor base, like the present Examples. In addition, it is preferable that the front end of the front part inclines upward like the present Examples in order to correspond easily to the curved seam of the floor sheets. Numeral 11 is the wheel which functions as the stabilizing member against the movement direction of the tool when the tool is used in cases where the seam of floor sheets is a straight line, 12 is the wheel shaft. This wheel 11 is naturally placed in the storage space for placing the said wheel set in the body. When a fixed member is used as the stabilizing member, the above storage space is not needed. In this case, the above fixed member may be set as appropriate using known fixation means: for instance, a male screw is set at the rear end portion of the fixed member whose cross-sectional shape corresponds to that of the groove, and also a screw hole screwed together to the said male screw is provided at the body bottom in order to screw together both for fixation.

In addition, in cases where a formed groove does not reach the floor base, a roller having a thin disk may be used as the stabilizing member so as to get into the seam of remaining sheets, and if necessary, a middle roller may further be set behind the first groove-cutting blade so as to get into the seam of remaining sheets.

Figure 7:
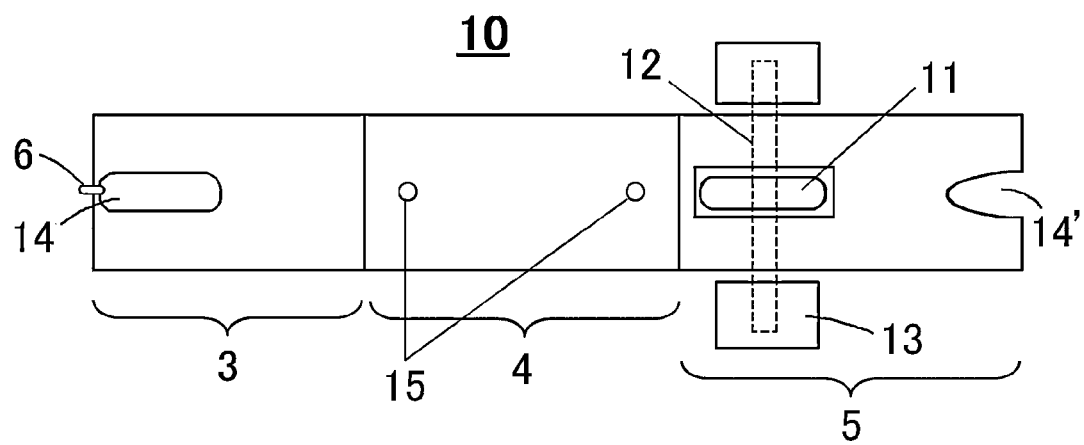
FIG. 7 is a bottom view of bottom of the groove cutter in FIG. 6.

FIG. 7 is a bottom view of the bottom part 10, omitting the groove-cutting blade 7 from the tool shown in FIG. 6. Numeral 13 in the views is a pair of rollers attached in order to improve the stability of right and left direction of the tool when used. These rollers are omitted in FIG. 6. Numerals 14 and 14' are openings where groove-like or tube-like spaces 8 and 8' for attaching the blade appear at the bottom part, and groove-cutting blades 7 and 7' are supposed to pass through these openings. Numeral 15 is a screw hole for fixing the bottom part to the body with a screw bolt. The number of fixation place and the position of fixation place can be designed as appropriate. It is preferable that a thread does not stick out from the bottom part by using a screw bolt having a flat thread.

Naturally, with regard to the tool of the present invention, all the nonmovable parts including the bottom part 10 can be manufactured integrally. Materials can be selected from among known materials appropriately, however, it is preferable in the present invention to use aluminum in particular.

Figure 8:
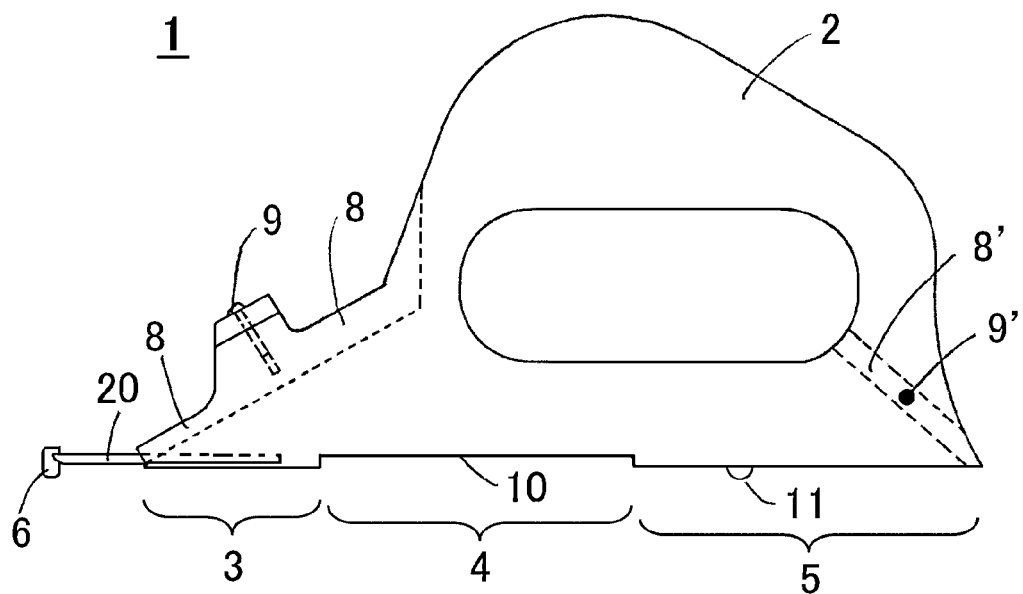
FIG. 8 is a left side view indicating a case wherein the front plate can move back and forth.

FIG. 8 is an example wherein the body bottom part is directly designed so as not to contact the bottom part of the middle part with sheets. Particularly, this is the example wherein the front plate 20 having thin guide plate 6 at the front part of the body bottom part is attached so as to be movable back and forth and be detachable. In the present Example, the fixed member is attached as the stabilizing member 11.

Figure 9:
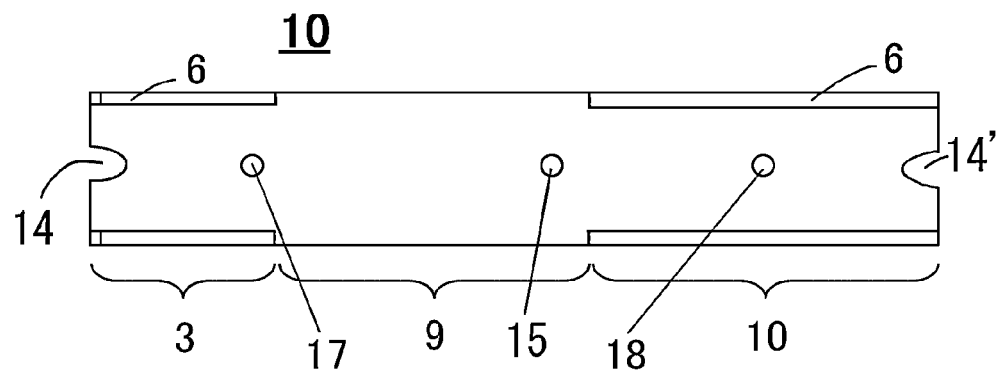
FIG. 9 is a bottom view of the groove cutter itself in FIG. 8.

FIG. 9 is a view indicating an example of the bottom part, wherein in order to be able to withstand the friction against the sheets when used, plates comprised of materials having high hardness such as SUS are attached in a detachable way at the front bottom part and rear bottom part. In the present Example, the flange 16 is attached on both sides of left and right of front and rear parts so that the plate can be detached easily with a bolt. Numeral 17 is a screw hole for fixing the front plate 20 with a screw bolt, 18 is a screw hole for fixing the rear plate with a screw bolt. When the above plate having high hardness is not attached at the rear bottom part, it is preferable that the flange part itself or at least the surface thereof is reinforced with the abrasion-resistant materials.

Figure 10:
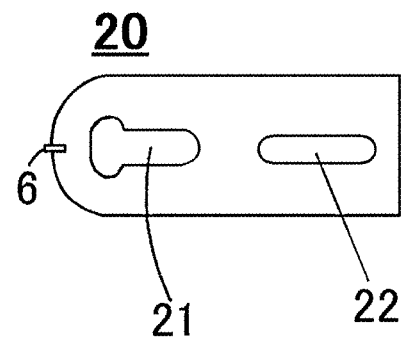
FIG. 10 is a view indicating an example of the front plate.

FIG. 10 is a view indicating an example of the front plate 20 which can move back and forth at the front bottom. Numeral 21 in the views is an opening for passing through the groove-cutting blade 7 and corresponds to the opening 14 in FIG. 7. Both openings can be designed as appropriate so as to make a shape for taking chips out easily. Numeral 22 is a slit for moving the front plate 20 back and forth and fixing it at a predefined position with a screw bolt.

Figure 11:
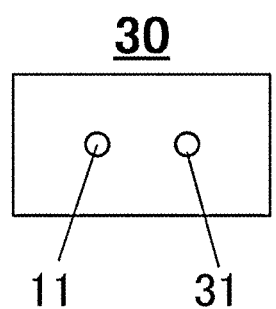
FIG. 11 is a view indicating an example of the rear plate.

FIG. 11 is a view indicating an example of the rear plate 30. Numeral 31 in the view is an opening for a screw bolt, which is screwed into the screw hole 18 provided at the body, in order to fix the rear plate 30. If a stabilizing member is a wheel, this rear plate 30 is usually longer than the diameter of the above wheel so that a hole for the wheel can be provided in the rear plate 30. However, if the stabilizing member 11 is a fixed member, the length thereof can be designed further freely in the same way as the present Examples. If the stabilizing member 11 is not attached to the rear plate 30, but attached to the body directly, the rear plate 30 can be made much smaller.

The tool of the present invention can be operated with a hand by gripping a handle part. If the handle part shown in the above Examples is not provided in particular, the middle part of the body functions practically as the handle part. Such a tool is also one of embodiments of the present invention. Definitely, it is free to design the part consisting of the middle part and the rear part as the part having an easy-to-grip shape. The handle part 2 in the present Example is an all-in-one with the body wherein the body has an easy-to-grip shape by hollowing out the body circularly. However, the handle part 2 can be manufactured as an independent grip from the body and be fixed to the body appropriately using the fixing means. In either event, when the contact area of the tool bottom of the present invention with sheets is larger, not only the movement of tool is heavier while in use, but also it is difficult to follow the surface irregularities of floor base and it is difficult to form a groove having a uniform depth. Therefore, it is preferable to design so as to make the above contact area as small as possible.

The front part has thin guide plate 6 and has the opening 14 behind the guide plate 6. Groove-cutter blade 7 passes through this opening and sticks out from the front bottom. In this case, if the distance between the said groove-cutting blade 7 and the above guide plate 6 is too small, it is difficult for chips to fall off from between the groove-cutting blade 7 and the above guide plate 6. Therefore, it is necessary that the distance is at least longer than the depth of groove formed. However, in the case of reaching an obstacle such as a wall, this distance remains as a non-cut distance. Hence, in the present invention, in order to shorten the above remaining distance, it is preferable to design the distance between the above groove-cutting blade 7 and the above guide plate 6 is adjustable by using the front plate, which functions as the front bottom having the above guide plate and can move back and forth, or to design the above guide plate 6 part as a part which can completely detachable in order to lose the above remaining distance, or to design the above guide plate 6 part as a part which can move more than 90 degrees upward.

In this regard, the front bottom corresponding to the front plate part 20 having the above guide plate 6 contacts with sheets. Therefore, it is preferable that the front bottom part is as small as possible (short plate or short bottom part) in order to follow the surface irregularities of base floor under the sheets.

Furthermore, in the present invention, in order to solve the problem of the above remaining part of cutting, the same blade as the above blade can be attached at the rear end portion. This blade can also function as a stabilizing member in general use, when the stick out distance of this blade from the bottom surface of the tool is adjusted to the depth of the groove to be cut. This blade at the rear end portion can stick out all the time, however, it is preferable to attach slidably in and out, in order to enhance safety of the tool and keep the edge of the blade. For that purpose, a person skilled in the art would be able to make the above front blade detachable using known technique such as the screw bolt 9' in the same way as using the screw bolt 9.

In the present invention, by using the blade 7' at the rear end portion which is equivalent to the blade used at the front part, and/or by attaching the wheel 11 having the width corresponding to the cut groove, or by attaching the stick-like or hemispherical stabilizing member 11 of which end cross-section corresponds to the cross-section of the groove, the stability for the direction of movement of the tool of the present invention can be ensured when used, however, the stability for crosswise direction of the tool cannot be sufficient by these technique. Therefore, it is preferable in the present invention that a pair of wheels, or a pair of rollers 13 which have a width larger than the wheel, is arranged on the right and left of the tool near the above stabilizing member 11. When the wheels 11 are provided as a stabilizing member, the shaft 12 of aforementioned wheels or rollers can be the same shaft of the wheels 11. Moreover, the above wheels 11 and rollers 13 may turn freely around the fixed rotating shaft 12 or may rotate integrally with the shaft 12. Where, the direction of the shaft is a direction orthogonal to the longitudinal direction of tool.

As described above, by attaching the wheels or rollers 13, the stability of the direction of movement and the direction orthogonal to it increases sufficiently when the tool of the present invention is used. In this case, in order not to make the use of tool heavier, due to occurring of unnecessary friction, or from the viewpoint of following easily the surface irregularities when a groove is cut, it is preferable to design the rear bottom surface in order not to contact with sheets in the same way as the middle part bottom surface. In addition, it is preferable to design so as for the radius of the above wheels or rollers 13 to be as small as possible in order to follow easily the surface irregularities of the floor.

By the way, in some cases, the seam 40 may often not be a straight line but a curved line. In order to be able to accommodate the groove-cutting along such curved seam, it is preferable in the present invention that the bottom end portion of front part having thin guide plate 6 is inclined upward toward the front (See. FIG. 6). By doing this, when the inclined surface 19 of front end bottom surface is attached firmly to sheets, this attached surface alone attaches tightly to the sheet, and even if the seam of sheets are curved lines, the tool can follow easily the carved seam. In order to accommodate such a case, it is required that a groove-cutting blade having a different shape from a blade cutting a straight line seam is used, or if the same blade as the one for the straight line seam is used, that blade is designed to be adjusted and fixed to the body at an angle suitable for the case of curved seam.

The guide plate 6 (See. FIG. 6) attached to the front part by fixing means such as welding is inserted into the seam of sheets where a groove is not cut, therefore, the insert depth thereof needs 1mm or more, however, does not need to reach the bottom of sheet. By inserting the guide plate 6, it is possible to move the tool along the seam. Therefore, if the seam of sheets 40 is a curved line, the front guide plate 6 alone is inserted into the seam of sheet. In this regard, the thickness of target sheets for using the tool of the present invention is usually 3 mm-7 mm.

Figure 12:
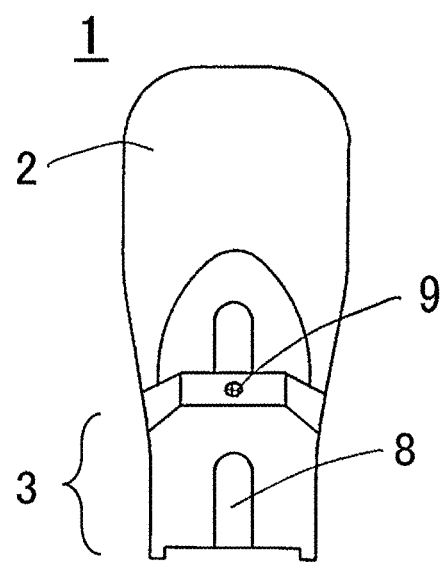
FIG. 12 is a front view of the groove cutter in FIG. 8 wherein the front plate is omitted.
Figure 13:
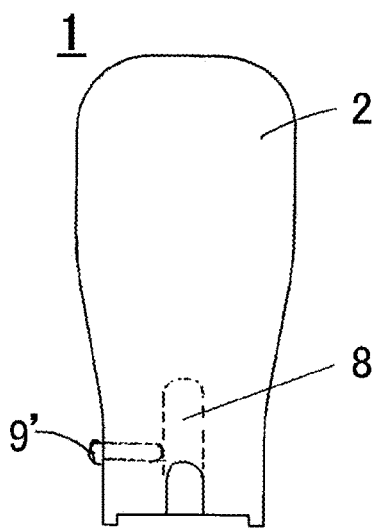
FIG. 13 is a back view of the groove cutter in FIG. 8 wherein the rear plate is omitted.

In the tool of the present invention, the groove-like or tube-like space 8 is provided on the body upper backwardly from the opening 14. For instance, U-shaped groove-cutting blade 7 is inserted in this space 8, then, after adjusting appropriately the blade direction and the blade length sticking out from the bottom surface, it is fixed by a known method such as a screw bolt 9. FIGS. 12 and 13 are a front view and a back view of a groove cutter corresponding to the embodiment of FIG. 8 wherein the front and back plates are omitted.

Figure 14:
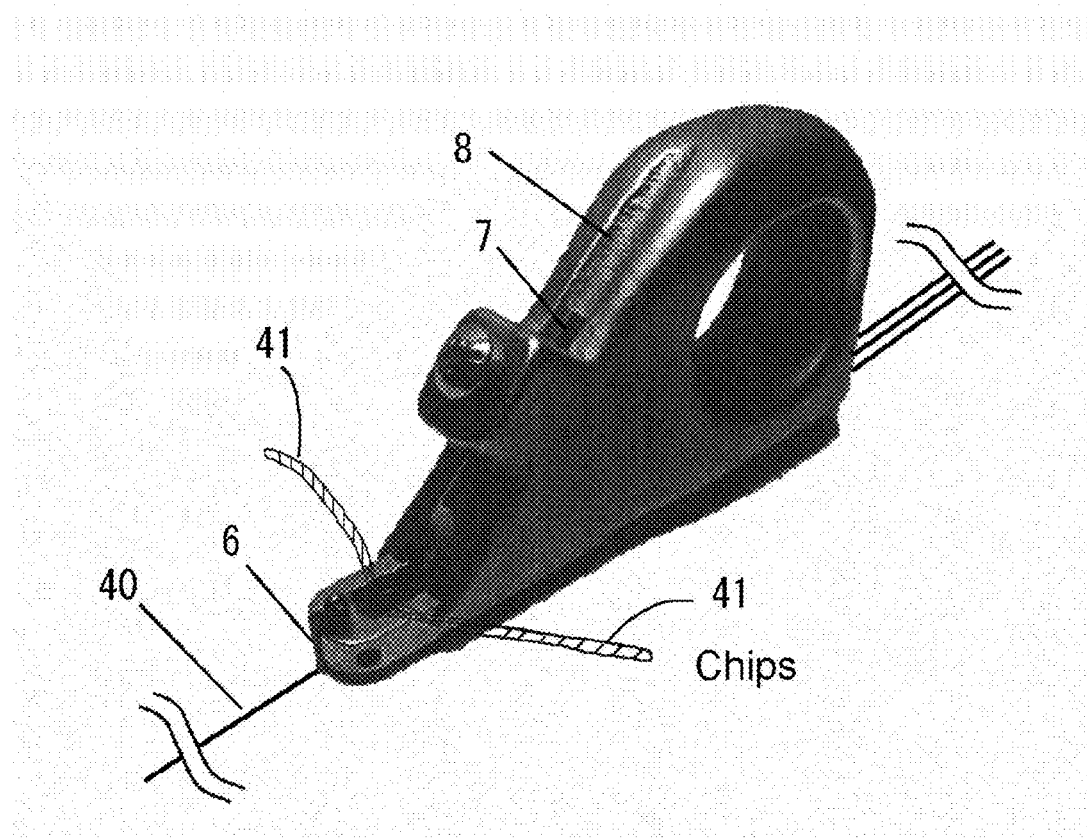
FIG. 14 is a view explaining the usage state of the groove cutter of the present invention.

As is shown in FIG. 14, when gripping the handle part of tool of the present invention, inserting the above guide plate 6 into the seam of sheets 40 and pushing it forward, a concave groove is cut on the seam of sheets 40 by U-shaped groove-cutting blade 7 set behind the guide plate 6. The chips 41 of cut sheets move upward along the groove of U-shaped groove-cutting blade 7 and after going through the opening 14 and being guided upward from the tool body, it is removed. In the present invention, it is preferable to make the opening 14 a mortar-like shape so that it can have a function of guiding the chips, and the chips do not block up.

In the present invention, the second blade (not shown) having narrower width than that of the first blade may be arranged behind the blade provided at the front part (the first blade) so that much deeper groove can be cut in the groove formed by the first blade. In this case, it is required that the groove formed by the first blade is relatively shallow, and the sticking out distance of the second blade from the bottom surface of the tool body is adjusted so that the groove depth cut by the second blade can be shorter than the thickness of the sheet.

In this embodiment, after a groove is formed by the first blade a narrower groove than the first groove width is then formed at the bottom of the first groove by the second blade. The depth of groove on the seam of sheets 40 increases by this procedure, and the groove structure having longitudinal cross-sectional shape, wherein a middle part of it is narrow, can be realized. As a result, the welding rod 50, which is welded and pressed into the seam, hardly detaches and the binding strength at the seam of sheets increases than that of simple groove structure. In this case, it is preferable to provide an opening, which is able to guide the chips, for such second blade.

INDUSTRIAL APPLICABILITY

By using the groove cutter of the present invention, it is possible to create a concave groove along the seam of sheets easily and accurately without using a ruler. In addition, it is possible to create a groove having a uniform depth by improving the following properties for small surface irregularities of floor, and to perform groove-cutting of curved seam emphasizing design thereof easily and accurately, and also to further create a groove inside the first cut groove by means of one time operation, which were difficult when a ruler was used. Therefore, not only the working efficiency of conventional groove-cutting welding operation can be remarkably improved, but also the welding rod, which is melted and pressed into the groove, can create a stronger binding strength between sheets since the rod hardly detaches from the groove.

Thus, the present invention is quite useful for industry.

EXPLANATION OF NUMERAL

1. Body
2. Handle part
3. Front part
4. Middle part
5. Rear part
6. Thin guide plate
7, 7' Concave groove-cutting blade
8, 8' Groove-like or tube-like space provided for equipping the groove-cutting blade
9, 9' Detachable•adjustable screw bolt for groove-cutting blade
10. Bottom area covering the whole area of front part, middle part and rear part.
11. Stabilizing member
12. Wheel shaft
13. Roller
14, 14' Opening for passing through the blade
15. Screw hole for fixing the bottom area to the body with a screw bolt
16. Flange
17. Screw hole for fixing the front plate with a screw bolt
18. Screw hole for fixing the rear plate with a screw bolt
19. Inclined surface
20. Front plate
21. Opening provided in the front plate
22. Slit provided in the front plate
30. Rear plate
31. Opening for fixing the rear plate 30 to the screw hole 18 of the body with a bolt
40. Seam of sheet
50. Welding rod

What is claimed is:

1. A groove cutter for floor sheets which is a tool capable of being operated without using a ruler and can cut a seam, which is created when sheets are laid sequentially on the surface of floor base with an adhesive agent, so that a groove formed along the seam can bridge over both adjacent sheets, comprising a front part, a middle part, a rear part, wherein the front part has a thin guide plate, which is insertable into the seam and guides the said tool along the said seam when pushing the tool forward, at the front end, and at least one blade to cut a concave groove at the seam part of the sheet, which is provided behind the guide plate so as to be detachable, and also a stabilizing member provided at the rear part, which is insertable into the concave groove, to stabilize a direction of movement of the tool along the seam, and wherein the bottom surface of the front end part having the guide plate is inclined upward, and the said guide plate having no corners has a smooth shape in order to be able to incline the tool forward easily along the inclined surface.

2. The groove cutter of claim 1, wherein an another blade for cutting a concave groove at the seam part is provided at the rear end portion of the rear part so as to be detachable, so that the another blade sticks out forward from the tool when the tool is moved back to front by making a rear part to be a front part.

3. The groove cutter of claim 1, wherein the front bottom part having the thin guide plate is provided slidably back and forth.

4. The groove cutter of claim 1, wherein a pair of rollers and/or wheels running on the surface of the sheets is provided at right and left of the tool near the stabilizing member of the rear part.

5. The groove cutter of claim 1, wherein a grip is provided mainly over the middle part.

6. The groove cutter of claim 1, wherein the front blade is provided just behind the guide plate and the second blade having a narrower width than that of the first blade provided in the front part is detachably provided behind said first blade so that a deeper groove can be formed inside the groove formed by the first blade.

7. The groove cutter of claim 1, wherein the stabilizing member provided at the rear part is a wheel having a width almost corresponding to the groove formed by the blade, or a fixing member having an end cross-sectional shape which corresponds to a cross-sectional shape of the groove.

8. The groove cutter of claim 1, wherein the front end of the front part includes the guide plate which is detachable from the tool or able to rotate 90 degrees or more upward, and wherein when the said front end portion is detached or is turned 90 degrees or more upward, the first blade at the front part sticks out forward from the tool.

9. A method for cutting grooves at the seam of the floor sheets comprising:

cutting grooves at the seam of floor sheets by using the groove cutter of claim 6, wherein the depth of the groove formed by the first blade is predetermined to be shallower than the thickness of sheets, and a deeper groove is formed by the second blade inside the groove formed by the first blade.

10. The groove cutter of claim 1 wherein the groove cutter is suitable for forming curved grooves without removing the groove-tracking roller and the rear-end grooving blade from the tool body.

11. A method for cutting grooves at the seam of the floor sheets comprising:

cutting grooves at the seam of floor sheets by using the groove cutter of claim 1, wherein the depth of the groove formed by the first blade is predetermined to be shallower than the thickness of sheets, and a deeper groove is formed by the second blade inside the groove formed by the first blade.

* * * * *